June 9, 1931. H. J. H. DUENSING 1,809,193
COMBINED ELEVATOR AND SAW
Filed March 31, 1930 5 Sheets-Sheet 1

Henry J.H.Duensing,
Inventor
By C.A.Snow & Co.
Attorneys.

June 9, 1931. H. J. H. DUENSING 1,809,193
COMBINED ELEVATOR AND SAW
Filed March 31, 1930   5 Sheets-Sheet 2
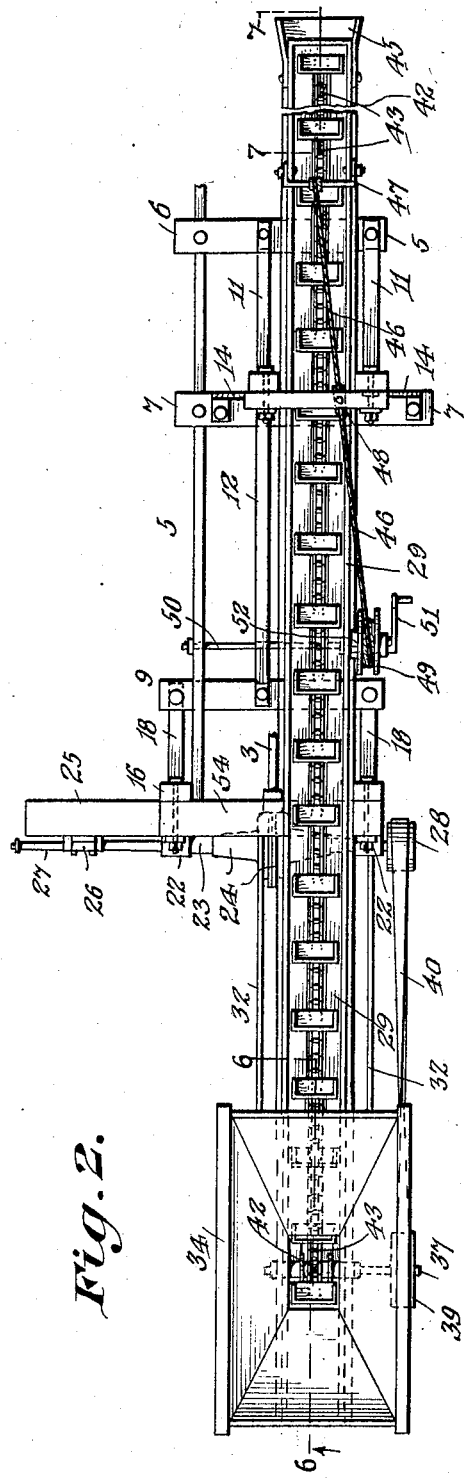
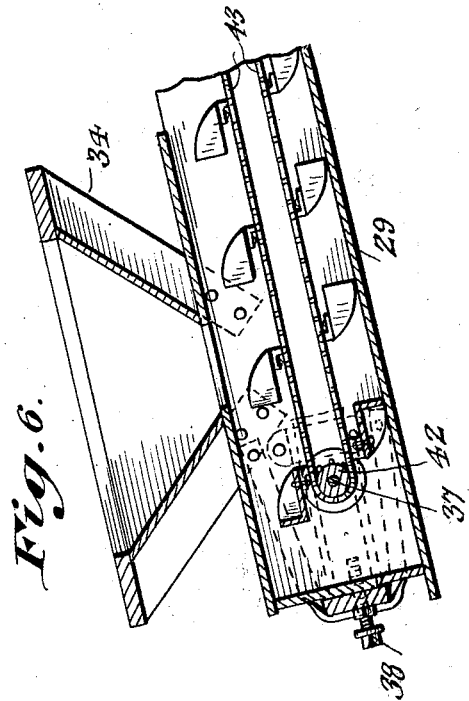
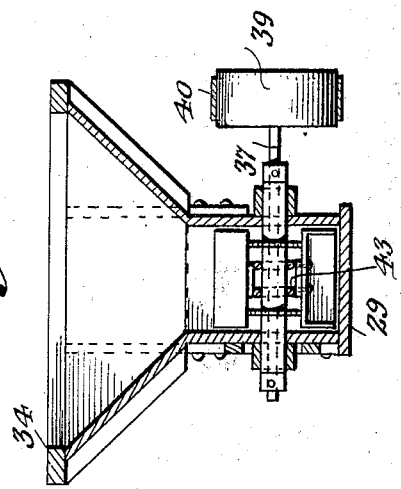
Henry J. H. Duensing, Inventor

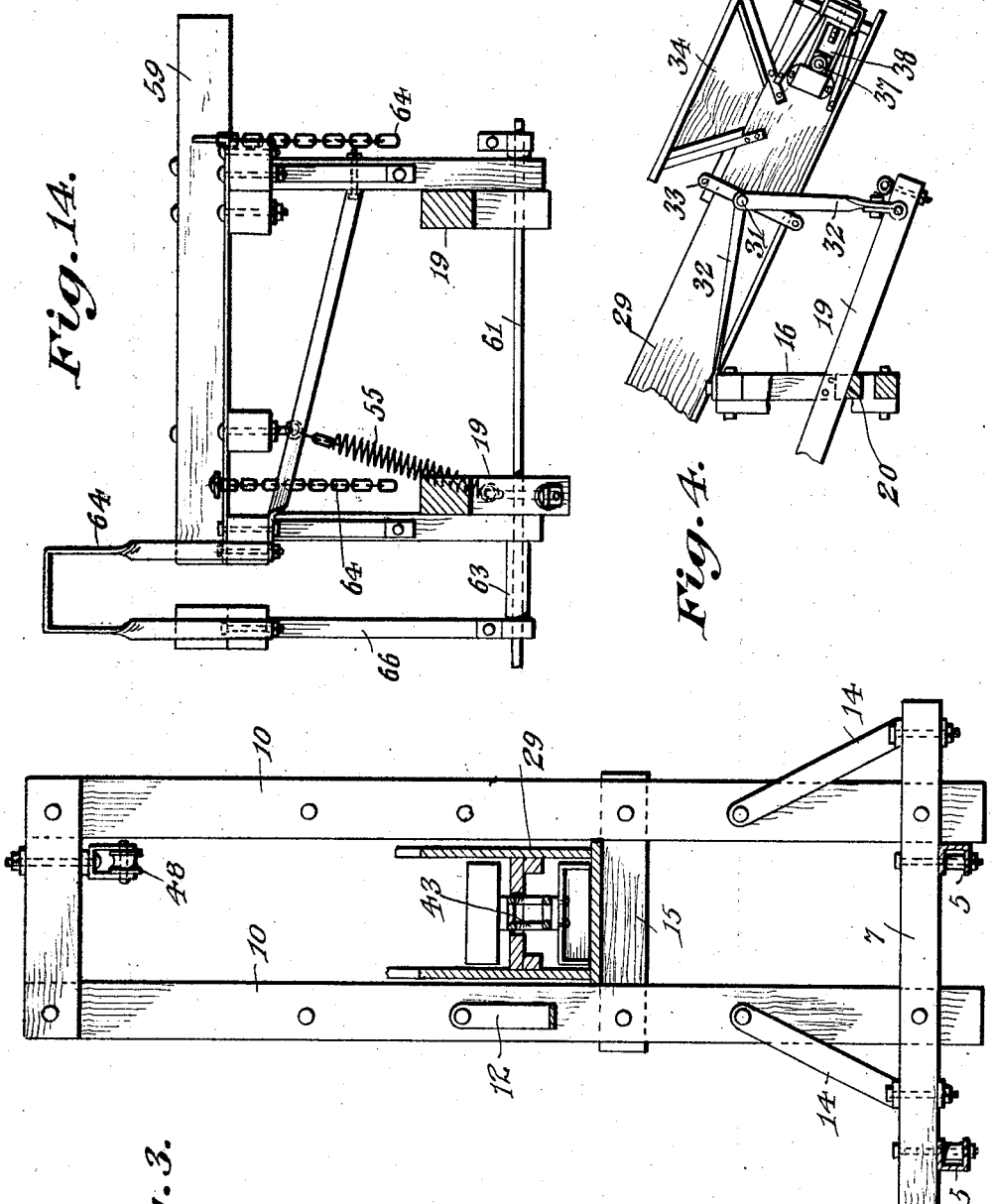

June 9, 1931. H. J. H. DUENSING 1,809,193
COMBINED ELEVATOR AND SAW
Filed March 31, 1930 5 Sheets-Sheet 4
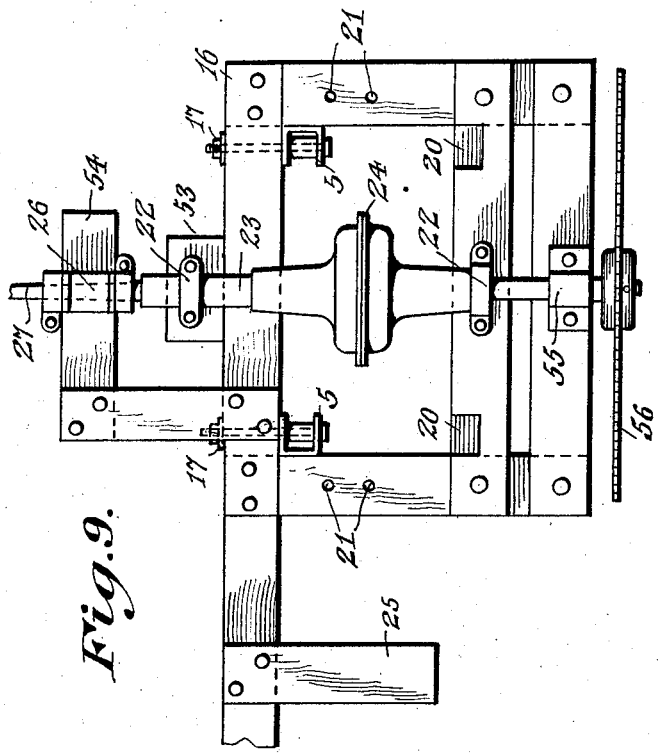
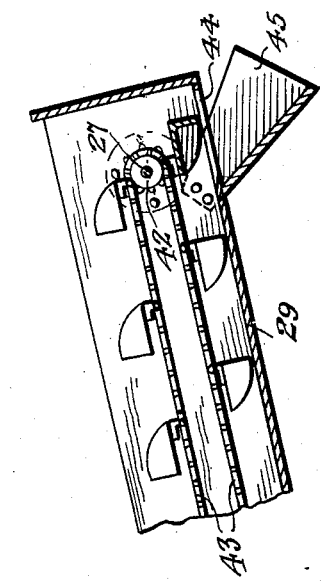
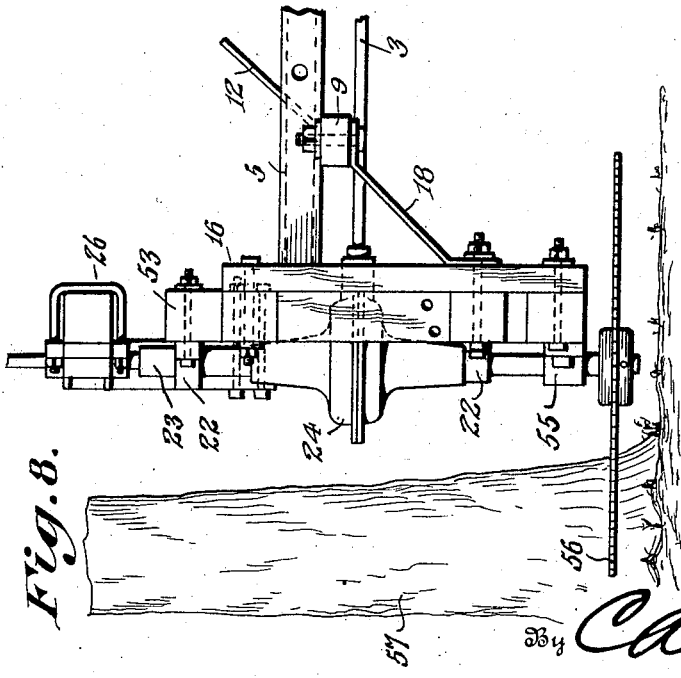
Henry J. H. Duensing, Inventor

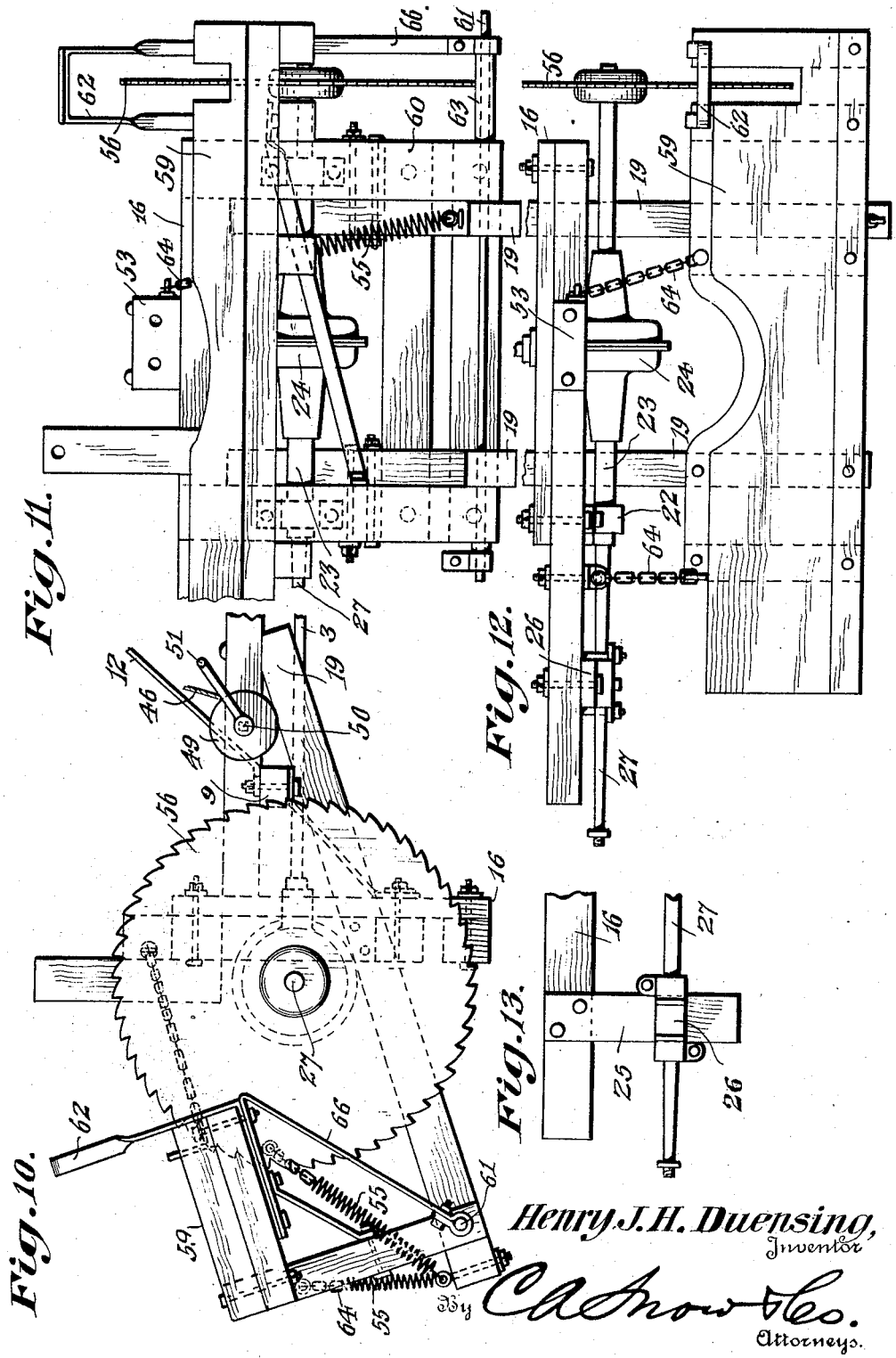

Patented June 9, 1931

1,809,193

UNITED STATES PATENT OFFICE

HENRY J. H. DUENSING, OF ODELL, NEBRASKA

COMBINED ELEVATOR AND SAW

Application filed March 31, 1930. Serial No. 440,469.

This invention aims to provide a simple means whereby a conveyor, a vertical buzz saw, or a horizontal buzz saw, may be operated at the will of the person in charge of the machine, novel means being provided for mounting and driving the instrumentalities above referred to, the construction being such that a standard part of an automobile may be used to transmit the motive power.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes may be made in the precise embodiment of the invention herein disclosed, within the scope of what is claimed, without departing from the spirit of the invention.

In the accompanying drawings:—

Figure 2 is a top plan of the conveyor mechanism employed in Figure 1;

Figure 3 is a vertical section on the line 3—3 of Figure 1;

Figure 4 is a side elevation disclosing a portion of the conveyor frame and attendant parts;

Figure 5 is a section on the line 5—5 of Figure 1;

Figure 6 is a section on the line 6—6 of Figure 2;

Figure 7 is a section on the line 7—7 of Figure 2;

Figure 8 is a side elevation showing the mechanism set up to operate a horizontal buzz saw;

Figure 9 is a rear end elevation of the mechanism disclosed in Figure 8;

Figure 10 is a side view, showing the mechanism erected to run a vertical buzz saw;

Figure 11 is a rear end elevation of the structure shown in Figure 10;

Figure 12 is a top plan of the device depicted in Figure 11;

Figure 13 is a view illustrating the mounting of one of the shafts;

Figure 14 is a sectional view illustrating a portion of the mechanism depicted in Figure 10.

Figure 1:
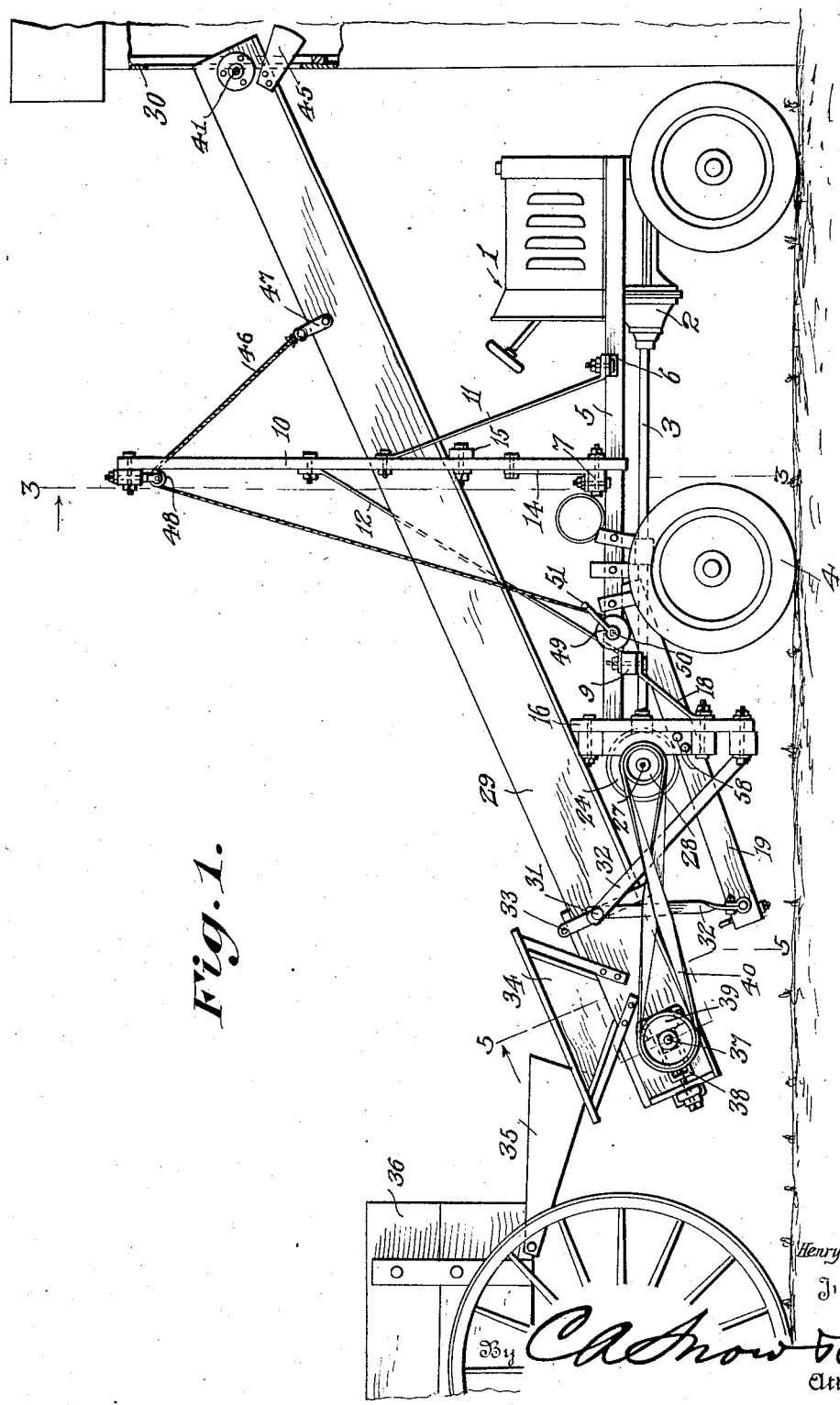
Figure 1 shows in side elevation, a device constructed in accordance with the invention, the machinery being set up for use as a conveyor.

The device forming the subject matter of this application may be used to operate a conveyor, and, in this connection, attention is directed to the first seven figures of the drawings.

The numeral 1 marks an automobile driven by an engine 2 (Figure 1), the engine 2 operating a shaft 3 which may be connected to the rear wheels 4 by any suitable mechanism, forming no part of the present invention. The main frame of the vehicle is marked by the numeral 5, and it carries, as shown in Figure 2, a front cross piece 6, an intermediate cross piece 7, and a rear cross piece 9.

A vertical standard 10 (Figures 1 and 3) is secured to the intermediate cross piece 7. Braces 11 sustain the standard 10 from the front cross piece 6, and braces 12 sustain the standard 10 from the rear cross piece 9. The standard 10 is connected to the intermediate cross piece 7 by braces 14. The standard 10 is supplied about midway of its length with a transverse bar 15.

The numeral 16 designates a depending vertical auxiliary frame disposed transversely of the main frame 5 and connected to the rear end of the main frame by securing elements 17, which are shown in Figure 9. It may be remarked that Figure 9 shows the details of the auxiliary frame 16, although certain parts of the mechanism are set up on the frame 16, in Figure 9, in a different position from that which they assume when the parts are assembled to form a conveyor mechanism, as shown in Figure 1.

Braces 18 connect the auxiliary frame 16 with the rear cross bar 9 (Figures 1 and 2). Inclined beams 19 are provided, the beams slanting downwardly and rearwardly. The forward ends of the beams 19 are detachably connected to the main frame 5. Intermediate their ends, the beams 19 rest in seats 20 provided in the auxiliary frame 16 (Figure 9). Securing elements 58 connect the beams 19 with the side portions of the auxiliary frame 16.

Figure 9 shows that the side portions of the auxiliary frame 16 have holes 21. The holes 21 form a place of mounting for clamps 22. In making the driving mechanism, it is contemplated that the rear axle housing of an automobile, the differential casing, and parts therein contained, will be used, it being possible, thus, for a builder to supply himself with necessary parts, without having them designed specially. The axle housing is marked by the numeral 23, and the differential is designated at 24. The clamps 22 engage the axle housing 23 and hold the axle housing on the frame 16, in a substantially horizontal position, as indicated in Figure 2, it being recalled that Figure 9, although useful as showing such details, represents a set-up different from the one under consideration.

The auxiliary frame 16 has a side bracket 25 to be seen in Figure 9, and on this side bracket 25 is mounted a lock 26 (Figures 13 and 2). The lock 26 engages one end of the shaft or axle in the axle housing 23, and holds that end of the shaft 27 against rotation, it being understood that the differential 24 forms an operative connection between the shaft 27 and the shaft 3, so that when the shaft 3 is driven from the engine 2, the shaft 27 will be driven also.

On that end of the shaft 27 which is remote from the lock 26 is mounted a pulley 28.

The numeral 29 indicates a conveyor frame, adapted to discharge into a grain bin 30, or any other place of storage. Supports 32 (Figures 1 and 4) are mounted on the auxiliary frame 16 and on the beams 19. The supports 32 carry pivot members 31, and the pivot members 31 are engaged with a retainer 33 that holds a hopper 34 on the rear end of the conveyor frame 29. By means of the pivot members 31, the conveyor frame 29 is so mounted that it can be swung up and down at its forward end, either to accommodate the forward end of the conveyor frame to the place of discharge, or to accommodate the rear end of the conveyor frame to the place of intake. The material which is to be conveyed and elevated may be discharged from a wagon 36 into the hopper 34, by means of a tail board 35 which is shown in Figure 1 of the drawings.

A rear shaft 37 is provided, and is carried by adjustable bearings 38 mounted on the rear end of the conveyor frame 29. On one end of the shaft 37 there is a pulley 39 driving a belt 40 engaged with the pulley 28 on the shaft 27. There are sprocket wheels on the shafts 41 and 37, and about the sprocket wheels (42) is engaged a belt conveyor 43. Below the forward end of the belt conveyor 43, an opening 44 is formed in the bottom of the conveyor frame 29, as shown in Figure 7. The opening 44 discharges into a chute 45 carried by the forward end of the frame 29, and the chute, in turn, discharges into the grain bin 30, as shown in Figure 1. Owing to the presence of the opening 44, the buckets on the belt conveyor 43 will not catch or clog as the belt conveyor passes around the foremost sprocket wheel 42, an observation which will be understood readily when Figure 7 of the drawings is noted.

One end of a flexible element 46 is connected to the conveyor frame 29 by an anchor 47. The intermediate portion of the flexible element 46 is drove over a pully 48 on the upper part of the standard 10. The flexible element 46 is wound about a drum 49 carried by a shaft 50 journaled in the main frame 5. The shaft 50 is operated by a handle 51. A pawl and ratchet mechanism 52 (Figure 2) prevents retrograde rotation of the shaft 50.

In practical operation, when the parts are arranged as shown in Figure 1, the material to be elevated moves from the wagon 36 through the tail board 35 into the hopper 34, the material being carried along in the conveyor frame 29 by the conveyor 43, the material running out through the opening 44 of Figure 7 into the chute 45, the chute 45 delivering the material into the bin 30.

The drive for the belt conveyor 43 comprises the engine 2, the shaft 3, the differential 24, the shaft 27, the pulley 28, the belt 40, the pulley 39, the shaft 37, and the sprocket wheel 42 on the shaft.

The operator can rotate the shaft 50 and the drum 49 by means of the handle 51, the flexible element 46 being reeled on the drum 49, or being paid off the drum, the forward end of the conveyor frame being raised and lowered. Generally, the intermediate portion of the conveyor frame rests on the transverse bar 15 of the standard 10, but there is no reason why the conveyor frame cannot be raised from that position, the conveyor frame swinging upwardly with the pivot members 31 as a center of swinging movement.

Reference now is had to Figures 9 and 8, wherein a slight rearrangement of parts is shown. In Figures 8 and 9, the beams 19, the supports 32, the conveyor frame 29, the belt 40, and the pulley 28 are removed. The axle housing 23 is turned through an angle of ninety degrees from the horizontal position of Figure 1, and stands vertically. The clamps 22 are shifted, one clamp being on the lower portion of the frame 16, and the other clamp being carried by a block 53 which is mounted on the upper portion of the frame 16. The lock 26 which holds one end of the shaft 27 against rotation is placed on a top bracket 54 carried by the frame. The lower portion of the shaft 27 is journaled in a bearing 55 on the lower part of the frame 16. A horizontal buzz saw 56 is mounted by any suitable means on the lower end of the shaft 27, and may be used to cut into a standing tree 57, as shown in Figure 8 of the drawings.

When the machine is set up as shown in Figures 10, 11, and 12, the axle housing 23 remains in horizontal position, as in Figure 1, but the pulley 29 is replaced by the buzz saw 56, as hereinbefore explained, the belt 40, the supports 32, and the conveyor housing 29 being removed. A table 59 is mounted to swing toward and away from the vertical buzz saw 56 of Figure 10, the legs 60 of the table being mounted to swing on a rod 61 carried by the lower part of the beams 19. A saw guard 62 is mounted at each end on the table 59. A brace 66 is connected to the table 59 and has its lower end mounted on the rod 61. A spacer 63 is interposed between the adjacent legs of the saw table and the brace 66. Flexible elements 64 are connected to the forward portion of the table 59, one of the flexible elements 64 being connected to the frame 16, and the other of the flexible elements being connected to the end of the block 53. The flexible elements 64 limit the rearward swinging movement of the table under the impulse of springs 55 connected at their rear ends to one of the beams 19, and at their forward ends to the table. Considered as a sawing instrumentality, the mechanism of Figures 10 and 11 operates like any other buzz saw to which the material is fed by a swinging table, and a detailed description of the operation is not necessary.

Having thus described the invention, what is claimed is:—

The combination with a twin shaft gear assembly, such as a rear-wheel driving mechanism for an automobile, including an elongated tubular axle housing, shafts journaled and enclosed in the housing and extended beyond the ends of the housing, and a differential located between the ends of the housing and connecting the said shafts: of means whereby such an assembly as a discarded rear-wheel driving mechanism, constructed as set forth, may be employed in the making of a portable power plant, said means comprising a main vehicle frame, ground wheels mounted on the main vehicle frame, a substantially vertical auxiliary frame fixed to the main frame to the rear of the ground wheels, an engine on the main vehicle frame, a driving shaft connected to the engine and to said differential, said differential constituting means whereby power is transmitted from the driving shaft to one of the enclosed shafts, and constituting means whereby the housing and the enclosed shafts may be turned in a substantially vertical plane transverse to the length of the vehicle frame, to cause the housing and the enclosed shafts to assume different angles, means for securing the housing fixedly to the auxiliary frame in at least two positions when the housing assumes any of said different angles, the auxiliary frame providing at least two spaced locations for means for holding the other of the enclosed shafts against rotation, when the housing assumes any of said different angles, thereby to render said differential effective to transmit power to the first-specified one of the enclosed shafts, and means on the first-specified one of the enclosed shafts for utilizing the power transmitted to it.

In testimony that I claim the foregoing as my own, I have hereto affixed my signature.

HENRY J. H. DUENSING.